United States Patent [19]
Dahl

[11] 3,733,894
[45] May 22, 1973

[54] MOTORCYCLE DYNAMOMETER

[75] Inventor: Christian W. Dahl, Minneapolis, Minn.

[73] Assignee: Hartzell Corporation, St. Paul, Minn.

[22] Filed: Feb. 11, 1972

[21] Appl. No.: 225,558

[52] U.S. Cl............................................73/117, 74/14
[51] Int. Cl............................................G01m 15/00
[58] Field of Search....................73/117, 123, 126; 74/13, 14

[56] References Cited
UNITED STATES PATENTS
2,287,084   6/1942   Bennett...................................73/117

*Primary Examiner*—Jerry W. Myracle
*Attorney*—Robert M. Dunning

[57] ABSTRACT

An apparatus for indicating the power output of a motorcycle or the like includes a box-like structure including means for clamping the front wheel in an upright plane while the rear of the motorcycle is free to swing about the steering axis. A barrel-shaped roller on a horizontal axis supports the driven wheel, the center of which is generally on the upright plane. As the motorcycle engine drives the driven wheel this wheel automatically centers with the roller. A dynamometer is driven by the roller.

8 Claims, 5 Drawing Figures

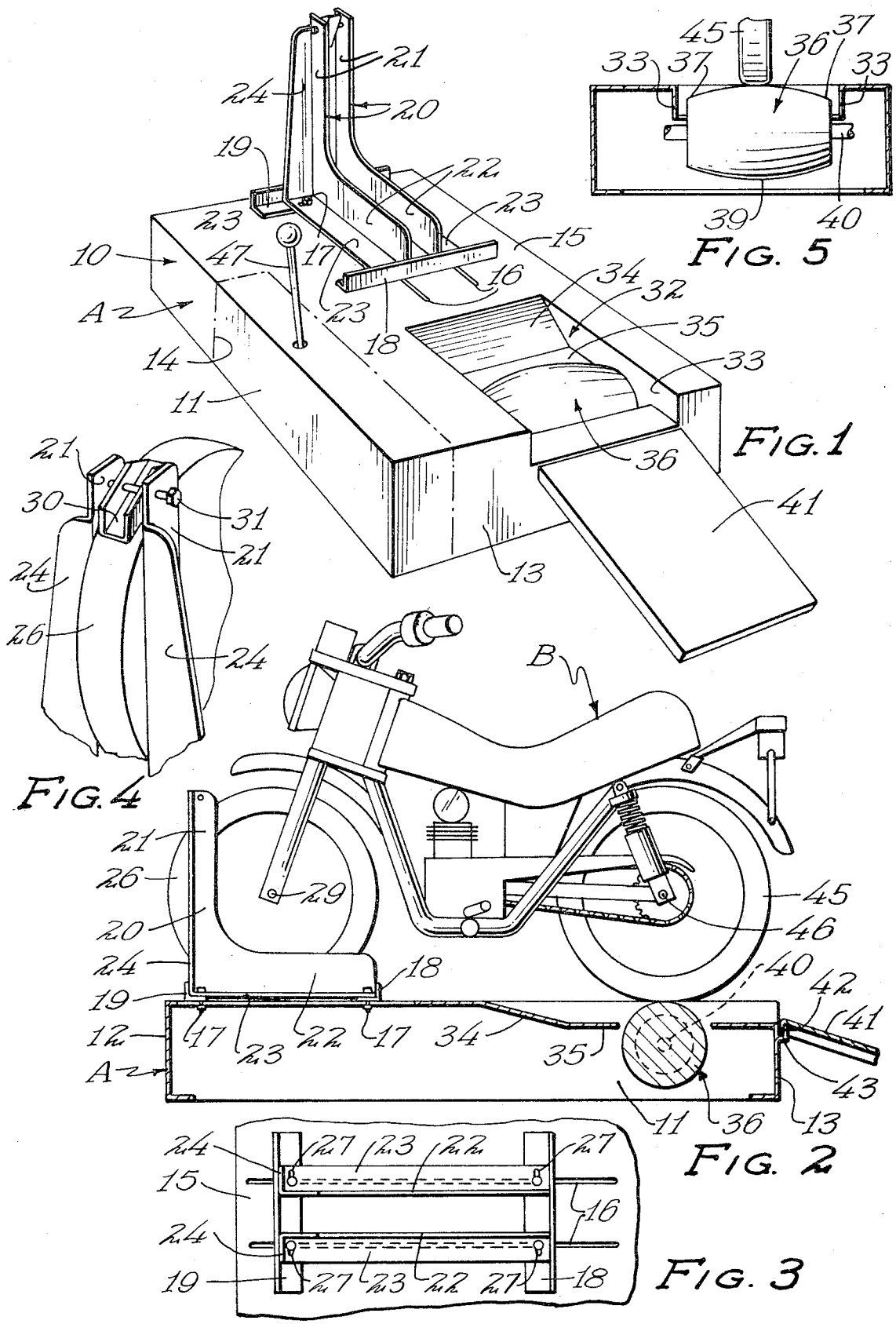

MOTORCYCLE DYNAMOMETER

This invention relates to an improvement in motorcycle dynamometer and deals particularly with a device for indicating the power output of a motorcycle or power actuated bicycle.

BACKGROUND OF THE INVENTION

Dynamometers have been used for a great number of years to measure the power output of devices of one type or another. For example, devices of this type are used to measure the output of engines of all types, and may also be used to measure the output of motor vehicles such as automobiles, snowmobiles and the like. It is an object of the present invention to provide a device which is particularly adapted for use in conjunction with a motorcycle or powered bicycle of one type or another.

One of the problems involved in measuring the power output of a motorcycle or the like lies in the fact that in order to be accurate, the power driven wheel of the motorcycle, or normally the rear wheel thereof, must be held in fixed relation to a rotatable drum which actuates the recording apparatus. As a result, it has been necessary to rigidly secure the motorcycle with respect to the apparatus while at the same time insuring the necessary contact between the drivewheel and the dynamometer in order to obtain accurate results. Such an apparatus usually is so complicated that considerable time is expended in mounting the motorcycle for its test, and for removing the vehicle after it has been tested. Furthermore, while it may be relatively simple to provide an apparatus capable of providing a measurement of the power of one particular style of motorcycle or powered bicycle, it is not usually a simple matter to adapt this device for vehicles of a different size. It is the purpose of the present invention to provide an apparatus which is capable of accommodating virtually any type of motorcycle or power operated bicycle of the type described and which may be readily adjusted to suit the vehicle being tested in an extremely short period of time.

It has long been known that slightly barrel-shaped pulleys are useful in maintaining alignment of belts from one pulley to another. However, I have found that a somewhat similar principle can be used in conjunction with the testing of a motorcycle or the like. A motorcycle or bicycle, by its nature, includes a front wheel which is pivotally supported relative to its frame so that it can be steered in one direction or another. The present device comprises an apparatus for engaging and supporting the front wheel of the motorcycle in an upright position with the axis of the wheel substantially horizontal. However, rather than to confine the rear portion of the vehicle between abutments which might affect the reading, the present device incorporates a slightly barrel-shaped pulley upon which the drive wheel of the motorcycle rests, and which is driven at a peripheral speed corresponding to that of the vehicle drive wheel. By forming the roller on which the drive wheel of the motor cycle rests of a generally barrel-shaped form (i.e., of smaller diameter of its ends than at its center), I have found that the motorcycle almost immediately centers itself upon the largest diameter portion of the roller and accordingly the means for guiding the power wheel of the device may be eliminated.

As will be understood, as the drive wheel of the motorcycle travels toward one end or the other of the barrel-shaped roller, it is necessary for the vehicle drive wheel to drive the roller at a greater speed. If there is a constant resistance to rotation of the roller, any movement of the drive wheel of the vehicle toward a smaller diameter portion of the roller is met with greater resistance due to the decreased radius at which the drive wheel engages the roller. As a result, when the motorcycle engine is started, and the rider mounted in place, the motorcycle seeks proper alignment with the largest diameter of the roller as long as the power driven wheel is rotated. Thus the rear of the motorcycle will not swing to one side or another, but will maintain contact with the largest diameter portion of the roller throughout the test.

These and other objects and novel features of the present invention will be more clearly and fully set forth in the following specification and claims.

BRIEF DESCRIPTION OF THE DRAWINGS

FIG. 1 is a perspective view of the apparatus in readiness for operation.

FIG. 2 is a diagramatic vertical sectional view showing the means for supporting the front wheel of the motorcycle or similar device, and showing the support therefor.

FIG. 3 is a top plan view of the front wheel support.

FIG. 4 is a perspective view of a detail portion of the apparatus.

FIG. 5 is an elevational view of the drive wheel supporting roller, the view omitting the various supports and drive means connected to this roller.

DESCRIPTION OF THE PREFERRED EMBODIMENT

In the following specification, the term "motorcycle" will be used to indicate the general type of device for which the present apparatus is designed. Quite obviously, motorcycles differ materially in design, appearance, and in dimensions. Furthermore, various bicycle attachments are provided for driving the same. The present device is designed to provide a measure of the output power of devices of this general nature, and the term "motorcycle" has been used to express the general type of device to be tested.

The apparatus is indicated in general by the letter A, and includes a generally box-shaped body 10 having longitudinally extending vertical side walls 11, a vertical front wall 12 indicted in FIG. 2, and a vertical rear wall 13 indicated in the same figure as well as in FIG. 1. The device A includes a dynamometer device which is indicated in general by the broken line 14 and which is designed to measure the power output of the vehicle being tested. In view of the fact that dynamometers are well known in the art, no specific type of device is shown and it should be understood that the apparatus is capable of providing either a graphic representation or a visible representation of the output of the motorcycle being tested.

The body of the device includes a top panel 15 which is provided with parallel slots indicated in general by the numeral 16. The slots 16 are designed to accommodate bolts such as 17 designed to secure the front wheel of the motorcycle in a fixed position. A pair of opposed angle irons 19 and 18 are secured to the top panel 15 in order to distribute the weight of the front end of the vehicle over a relatively large area of the cover 15. A pair of spaced retaining plates 20 are designed for engagement with opposite sides of the front wheel of the motorcycle to hold this wheel in axial alignment with the enclosure. The retaining members 20 are generally L-shaped in form and include vertical flanges 21, and horizontal flanges 22. At the lower end of the horizontal flanges 22, anchoring flanges 23 are provided by means of which the members 20 may be held in adjusted position. The vertical flanges 21 are also provided with outwardly extending flanges 24 which are in right angular relation to the flanges 23, and which are connected integrally thereto.

The purpose of the arrangement described is to engage opposite sides of the front wheel 26 of a motorcycle B to hold the front wheel in a vertical plane and extending longitudinally of the supporting structure 10. The angle irons 19 and 18 are adjustable longitudinally of the slots 16, while the angle irons are also adapted to support the wheel engaging members 20 for lateral adjustment as indicated by the slots 27 in FIG. 3 of the drawings. The wheel engaging members 20 are spaced apart a distance sufficient to snugly accommodate the front wheel 26 of the vehicle therebetween, and these members hold the front wheel on a plane vertical to the axis of the wheel pivots 29. A pivotal dog 30 of channel-shaped form is pivotally supported on a pivot bolt 31 extending between the upper ends of the vertical flanges 21. This device is of channel-shaped cross-section and the walls of the structure are tapered so that, if necessary, the dog may swing into contact with the tread of the front tire 26 to definitely hold the wheel from rotation.

The box-like frame 10 is provided with a recess indicated in general by the numeral 32 having downwardly extending parallel sides 33 and having an upwardly and forwardly inclined portion 34 connected to a generally horizontal portion 35 which extends into close proximity with the roller. The roller 36 is generally barrel-shaped in form, being of smaller diameter at its ends 37 than at its center portion 39. The roller 36 is mounted upon a shaft 40 which is supported by suitable bearings, not illustrated in the drawings, and which is connected to the dynamometer 14 to provide a means of indicating the power output of the motorcycle.

For convenience in mounting or dismounting a motorcycle from the apparatus, a ramp 41 is provided with a hook-shaped end 42 (see FIG. 2) which is engageable into suitable accommodating brackets 43 on the end wall 13 of the apparatus. This ramp 41 may be attached to the device so that the motorcycle may be readily rolled up into place upon the apparatus A.

The operation of the apparatus is believed obvious from the forgoing disclosure. The front wheel of the motorcycle B is engaged between the members 20 and is definitely supported in longitudinal relation to the box-like body 13. The position of the front wheel is located so that the rear wheel 45 of the motorcycle has its axis 46 directly above the axis of the shaft 40 and the roller 36 which is supported thereby. The engine of the motorcycle is started, and the rear drive wheel 45 acts to drive the roller 36. The roller 36, being connected to the dynamometer 14 provides an indication of the power output. Resistance to the rotation of the rear wheel may be adjusted by use of a control lever such as 47 so that the power output under selected speeds of rotation of the power drive wheel may be measured.

While the entire rear end of the motorcycle is free to swing about the axis of the handlebars of the motorcycle, in actual practice, the drive wheel 45 must exert greater pressure to drive the roller 36 as the rear drive wheel swings toward the smaller diameter ends 37 of the roller. As a result, shortly after the motorcycle engine is started, the motorcycle will straighten out with the back wheel 45 engaging the largest diameter portion of the roller 36, eliminating all requirements for complicated fastening means and other means for securing the motorcycle in an upright position during the testing operation.

In accordance with the Patent Office Statutes, I have described the principles of construction and operation of my improvement in motorcycle dynamometer, and while I have endeavored to set forth the best embodiment thereof, I desire to have it understood that changes may be made within the scope of the following claims without departing from the spirit of my invention.

I claim:

1. A device for supporting a tandem two wheeled vehicle in which the front wheel is pivotal relative to the rear portion thereof which includes the power supply and power driven wheel, the device including:
   a body portion,
   means on said body portion for holding the vehicle front wheel in an upright fixed position,
   a roller supporting the rear power driven wheel and arranged on an axis generally parallel to the axis of said driven wheel,
   said roller being generally barrel-shaped in outline, and
   a dynamometer device connected to said roller.

2. The structure of claim 1 and in which said holding means includes a pair of members engageable with opposite sides of said front wheel.

3. The structure of claim 2 and in which at least one of said members is adjustably supported.

4. The structure of claim 2 and in which said members are generally L-shaped in outline.

5. The structure of claim 2 and including means pivotally supported between said members engageable with the periphery of said front wheel.

6. The structure of claim 1 and including a ramp connected to said body portion over which the vehicle may be directed onto said body portion.

7. The structure of claim 3 and in which said front wheel engaging means is adjustable laterally with respect to one another.

8. The structure of claim 3 and in which said front wheel engaging means is adjustable toward and away from said roller.

* * * * *